Nov. 12, 1957  R. J. ANDERSON ET AL  2,812,774
MODULATING AND SHUT-OFF VALVE
Filed Dec. 20, 1951  3 Sheets-Sheet 1
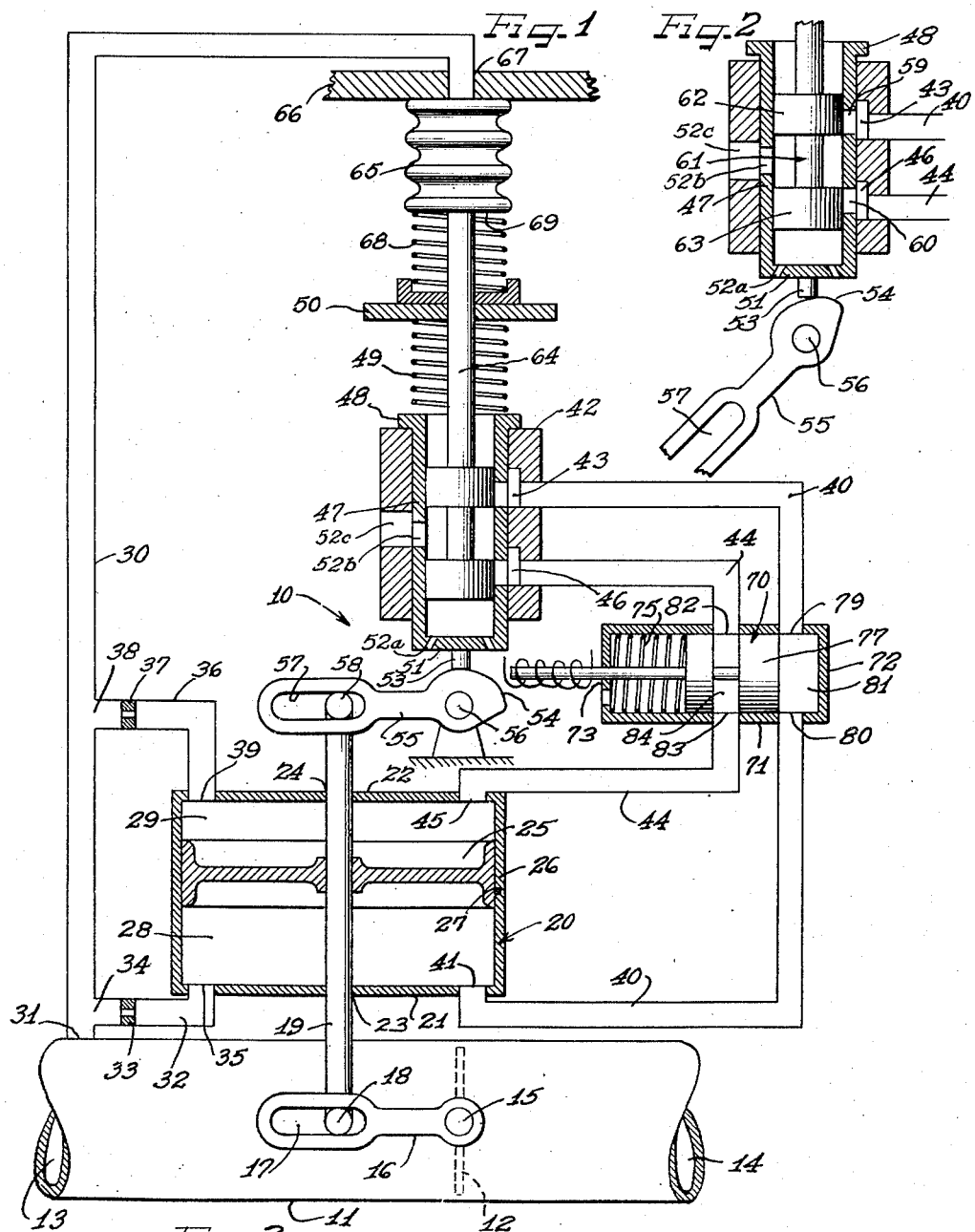
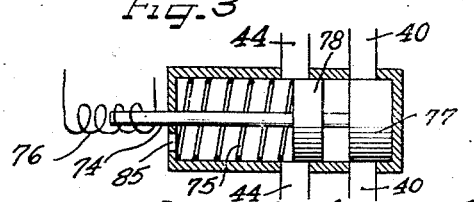
Inventors
ROBERT J. ANDERSON
ALLEN E. LEPLEY

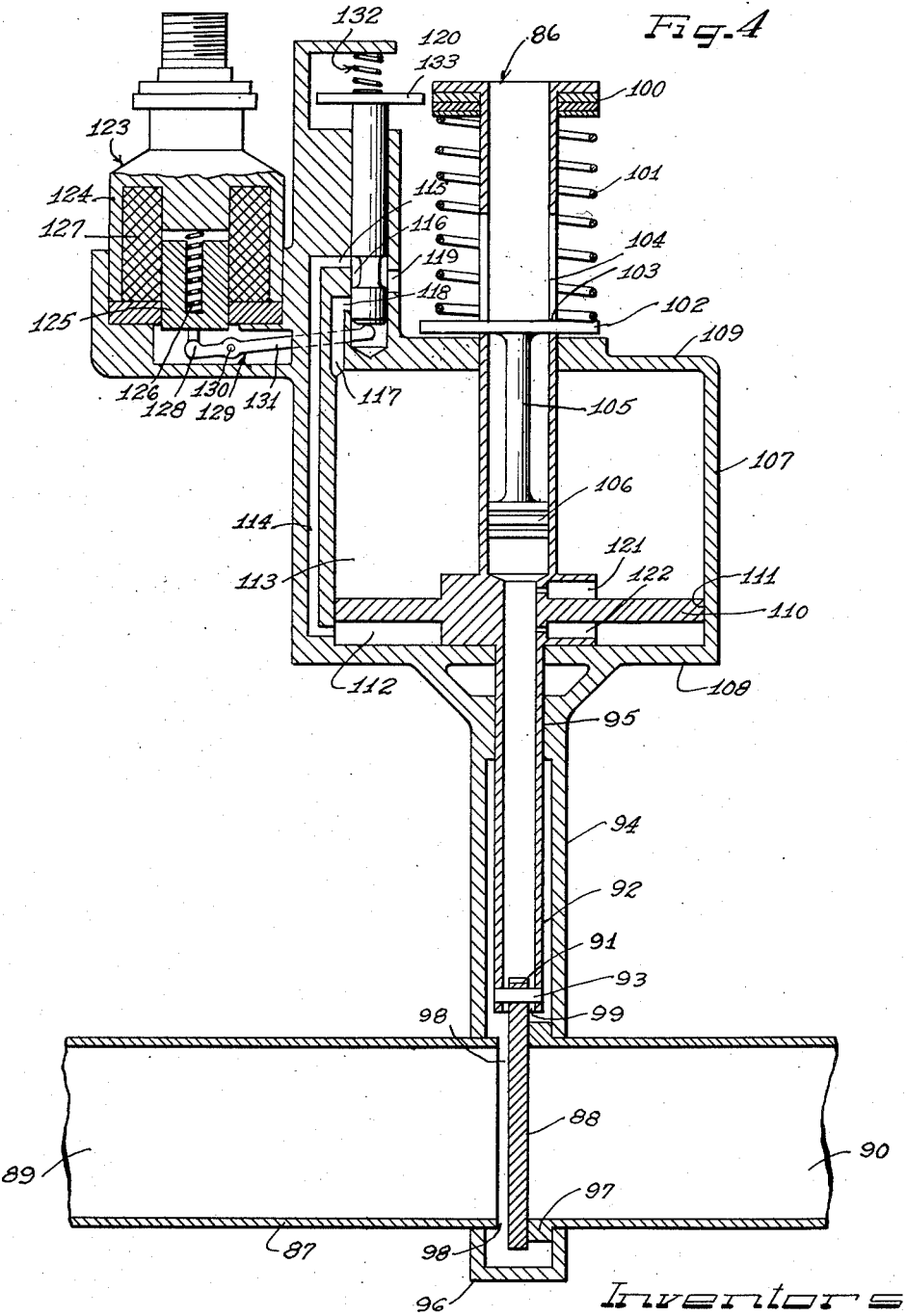

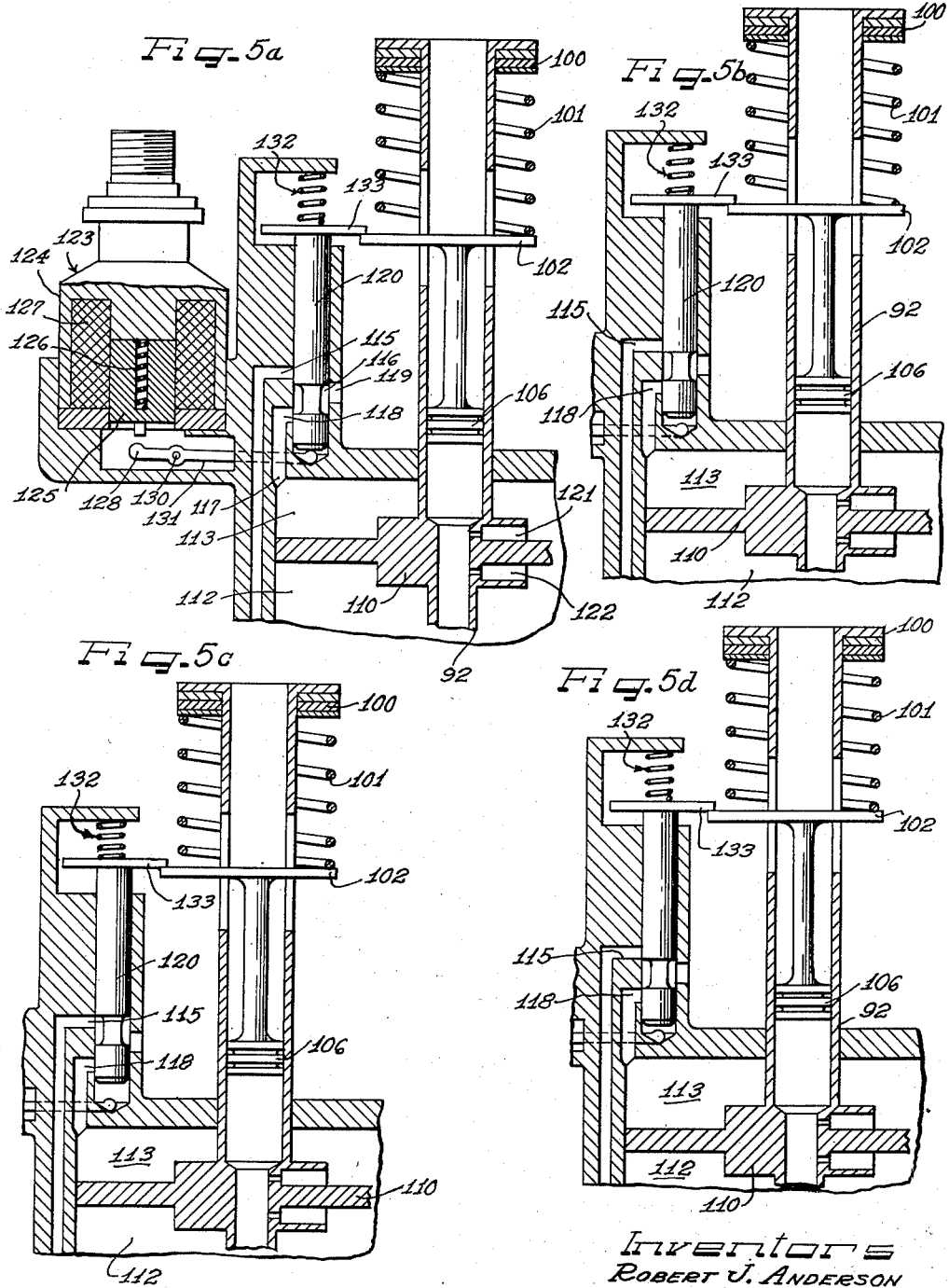

United States Patent Office 2,812,774
Patented Nov. 12, 1957

2,812,774

MODULATING AND SHUT-OFF VALVE

Robert J. Anderson and Allen E. Lepley, Cleveland, Ohio, assignors to Thompson Products, Inc., Cleveland, Ohio, a corporation of Ohio Application December 20, 1951, Serial No. 262,556

11 Claims. (Cl. 137—489)

This invention relates to an improved flow control apparatus and, more particularly, to an improved operating mechanism for a valve for controlling the flow of fluid therethrough.

Certain difficulties are ordinarily encountered in the operation of an automatic control valve for regulating the flow of fluid therethrough, principally because of the difficulty in obtaining a desired type of control by the use of one actuating variable. For example, in a given instance, it may be desired to operate such a control valve mainly in response to the fluid back pressure, but not in direct or linear response thereto. Such, however, is not possible by the use of the ordinary control mechanism, because that mechanism has an essentially linear operation, in that the movement or operation of the valve stem is governed solely by a single variable, such as the fluid back pressure. In other words, such a control valve opens and closes solely in response to variations in an operating pressure.

In certain instances, for example, in the control of the afterburner turbine driven pump of a jet engine, linear control is not desired. A control valve for such purposes restricts air flow in proportion to the available inlet air pressure. When the air pressure from the jet engine compressor is low, the valve opens wide so as to offer no restriction to the air flow. As the pressure increases, however, the valve stem should move according to a scheduled demand curve, instead of as a linear function of the pressure increase.

The instant invention has to do with an improved operating mechanism for a valve for controlling flow therethrough of a fluid having a variable flow rate and pressure.

According to the features of the present invention, the improved operating mechanism comprises a first means actuable by a fluid pressure differential for controllably opening and closing the valve, a second means responsive to variations in the flowing fluid pressure for imparting actuating differential fluid pressure to the first means and a third means cooperating with said second means for modulating the actuating effect thereof upon the first means.

It is therefore an important object of the present invention to provide an improved operating mechanism that is energized for automatic operation by means of the pressure of the fluid whose flow is controlled by the valve.

Another object of the present invention is to provide an improved valve operating mechanism for fluid flow control that is responsive to one variable in the fluid flow, as modulated by the valve position.

It is still another object of the instant invention to provide an operating mechanism for a fluid flow control valve that is responsive according to a schedule of valve inlet pressure versus valve position.

It is a further object of the instant invention to provide an automatic valve operating mechanism that is sturdy and simple in design and operation.

It is another important object of the invention to provide a control valve, an actuating pilot valve therefor and an off-on actuator. When such actuator is in closed position the control valve is not responsive to the pilot valve. When such actuator is in open position, the control valve immediately assumes the correct modulating position. The pilot valve perpetually takes the position required by the line pressure whether the actuator is on or off. By this means the normal incompatibility between a modulating and a shut off valve is overcome and both functions are incorporated in a single valve.

Other objects, features and advantages of the present invention will become apparent to one skilled in the art from the following description of the embodiments illustrated in the accompanying drawings in which:

In the drawings:

Figure 1 is an elevational view of a preferred embodiment of the valve control mechanism of the instant invention showing parts in section and parts diagrammatically;

Figure 2 is an elevational sectional view showing another position of the pilot valve and the cam of Figure 1;

Figure 3 is an elevational sectional view of the cut-off valve of Figure 1 showing the valve in off position;

Figure 4 is an elevational sectional view of another preferred embodiment of the valve control mechanism of the invention; and Figures 5a, 5b, 5c and 5d are partial views of the mechanism of Figure 4 showing various positions of the valve parts during operation.

As shown on the drawings:

The reference numeral 10 indicates generally a valve control mechanism mounted on a cylindrical air inlet duct 11 for controlling the flow therethrough of a fluid (such as air) which ordinarily has variable flow rate and pressure. The duct 11 may be used, for example, in conjunction with an afterburner pump (not shown) in a jet engine. The flowing fluid approaches a fluid control member or damper 12 from the upstream side 13 of the duct 11, flowing against the damper 12. To the extent that the damper 12 is opened, a portion of the fluid passes on into the downstream end 14 of the duct 11. The damper 12 shown herein is a disc-shaped member rotatable about a diametrical axis thereof and suitably mounted on pivot arms 15 aligned with the diametrical axis of rotation and extending through and mounted on the walls of the duct 11 (forming a fluid seal therewith). It is to be understood, of course, that fluid control members other than the damper 12 may be used in the practice of the instant invention, although in controlling the flow of air at high pressures and high flow rates a typical butterfly valve damper is ordinarily preferred.

Rigidly fixed to one of the arms 15 by any suitable means is a damper lever 16 rotatable with the damper 12 for operation thereof. The damper lever 16 contains a slot 17 extending radially of the pivot axis of the pivot arm 15 for receiving in slidably operative engagement a boss 18 mounted at one end of a driving shaft 19 which is movable longitudinally. The shaft 19 passes longitudinally through fixedly mounted upright cylinder 20, passing through the bottom wall 21 and the top wall 22 thereof so as to be freely movable longitudinally in the cylinder 20 and to form fluid seals at the passageway 23 in the bottom wall 21 and at a passageway 24 in the top wall 22 of the cylinder 20. Rigidly mounted upon the central portion of the shaft 19 by any suitable means is a piston 25 retained within the cylinder 20 for slidably operating therewith to form a fluid seal at the interface 26 between the peripheral piston walls 27 and the inner cylindrical walls of cylinder 20. The piston 25 so positioned forms a fluid-tight separating wall between a lower chamber 28 (enclosed by the bottom wall 21, the inner cylindrical walls of the cylinder 20 and piston 25) and an upper chamber 29 (enclosed by the top wall 22, the inner cylindrical walls of the cylinder 20 and the piston 25).

The cylinder 20 having the piston 25 therein and relatively movable thereto for drivingly engaging the damper lever 16 to rotate the lever 16 upwardly or downwardly constitutes a double-acting power cylinder in control of the valve, or in control of the operation of the damper 12. The double-acting power cylinder operates in response to the creation of a fluid pressure differential across the piston 25.

A tube 30 communicates with the upstream end 13 of the duct 11 at an opening 31 therein for the purpose of communicating the fluid pressure in the duct 11 to certain operating members of the valve control mechanism, 10. A lower inlet line 32 having a restriction 33 therein communicates with the tube 30 at 34 and with the lower chamber 28 at an opening 35 in the bottom wall 21 of the cylinder 20. An upper inlet line 36 likewise having a restriction 37 therein communicates with the tube 30 at 38 and with the upper chamber 29 at an opening 39 in the upper wall 22 of the cylinder 20. The inlet lines 32 and 36, respectively, thus supply fluid under the same pressure to the chambers 28 and 29 so as to create equal fluid pressure on either side of the piston 25 for holding the piston 25 in position.

A lower vent line or tube 40 communicates with the lower chamber 28 through a passageway 41 in the bottom wall 21 of cylinder 20 at one end of the vent line 40. The other end of the vent line 40 communicates with a fixedly mounted cylindrical sleeve 42 at an upper passageway 43 in the walls thereof. An upper vent line or tube 44 communicates with the upper chamber 29 through a passageway 45 in the top wall 22 of the cylinder 20, at one end of the upper vent line 44. The other end of the line 44 is mounted on the sleeve 42 and spaced a given distance below the point at which the one extremity of the line 40 is mounted on the sleeve 42 and communicating with a lower passageway 46 passing through the cylindrical wall of the sleeve 42. The lower passageway 46 is, likewise, spaced a given distance below the upper passageway 43 in the walls of the sleeve 42.

Slidably mounted within the sleeve 42 and in contact with the inner walls thereof is a cylinder 47 functioning as a piston in the sleeve 42. The cylinder 47 has a top annular flange 48 which limits its downward movement. In contact with the top of the annular flange 48 is a spring 49, the top of which abuts a fixed support 50 and the bottom of which abuts the annular flange 48 so as to resiliently resist upward motion of the cylinder 47. The top end of the cylinder 47 is open to the air and the cylinder 47 is vented at the bottom and the side at 52a and 52b respectively. The sleeve 42 is also vented at the side at 52c in alignment with the vent 52b in the cylinder 47.

Suitably mounted on the bottom wall 51 of the cylinder 47 is a leg 53 slidably engaging a cam surface 54 of a cam lever 55. The cam lever 55 is rotatably mounted upon a fixed pivot 56 so that the cam surface 54 in slidable engagement with the leg 53 may be caused to move the cylinder 47 as the result of rotation of the cam lever 55.

A slot 57 in the cam lever 55 extends radially of the fixed pivot 56 and receives a boss 58 for slidable coaction therewith. The boss 58 is mounted on the shaft 19 at the extremity opposite the extremity of the shaft which carries the boss 18.

It can thus be seen that upward and downward movement of the shaft 19 causes rotation of the cam lever 55 by means of the coaction between the boss 58 and the slot 57, which in turn causes upward or downward movement of the cylinder 47, by means of the coaction between the leg 53 and the cam surface 54. The position of the cylinder 47 is thus a function of the position of the piston 25 mounted on the shaft 19, as well as the damper 12 fixedly attached to the damper lever 16. The position of the damper 12 is a function of the pressure in the duct 11. The position of the cylinder 47 is thus also a function of the pressure in the duct 11, although not a straight line function.

The particular function correlating the position of the cylinder 47 with the position of the piston 25, or the damper 12, or the pressure in the duct 11, is dependent upon a number of known variables. For example, the correlation between pressure in the duct and the position of the cylinder 47 is based upon the fluid flow restricting characteristics of the damper 12, and the forced transmitting characteristics of the slotted damper lever 16, the shaft 19, the slotted cam lever 55, and the cam surface 54. Each of the foregoing may of course be adjusted or altered so that any particular desired function may be obtained.

In the practice of the invention, it is preferred that the particular function be a non-linear function (since the fluid pressure alone may be used to operate a valve as a linear function thereof). Preferably, the non-linear function is determined by the design of the cam surface 54. However, a non-linear function could also be obtained by, for example, offsetting either of the slots 17 or 57.

As shown in Figure 2 herein, downward rotation of the cam lever 55 because of downward movement of the shaft 19 causes the cam surface 54 in slidable engagement with the leg 53 to move the cylinder 47 upward against the resilient spring 49. The extent to which the cylinder 47 is moved upwardly by a given movement of the shaft 19 depends upon the particular contour of the cam surface 54.

The cylinder 47 contains in its cylindrical wall an upper vent 59 and a lower vent 60 positioned a given distance below the upper vent 59. The upper vent 59 communicates with the passageway 43 in the walls of the sleeve 42 which in turn communicates with one extremity of the vent line 40, so as to allow free fluid flow through the line 40, the passageway 43 and the vent 59 into the interior of the cylinder 47. The lower vent 60 communicates with the passageway 46 which in turn communicates with the vent line 44, so as to permit free flow of fluid through the line 44, the passageway 46 and the vent 60 into the interior of the cylinder 47.

Slidably mounted in the cylinder 47 is a piston 61, which cooperates with the cylinder 47 so as to open and close the vents 59 and 60. Preferably the piston 61 is in the form of a dumb-bell valve or double piston having an upper piston member 62 adapted to open and close the vent 59 in the cylinder 47 and a lower piston member 63 adapted to open and close the vent 60 in the cylinder 47.

The piston 61 is mounted rigidly upon shaft 64 by any suitable means. The shaft 64 extends upwardly through the fixed support 50 so as to permit free axial motion of the shaft relative to the fixed support 50 and is engaged by a bellows 65 above the fixed support 50 for imparting axial movement to the shaft 64.

The bellows 65 abuts a fixed supporting structure 66 and communicates with the upstream side of the duct 11 by means of the tube 30 which passes through a passageway 67 in the supporting structure 66 and communicates with the top of the bellows 65 abutting the structure 66 so as to transmit the fluid pressure in the duct to the bellows 65. The bellows 65 are adaped to extend linearly (or axially with respect to the shaft 64) in response to increases in the fluid pressure in the duct 11. A control spring 68 abuts the fixed support 50 and resiliently resists linear extension of the bellows 65 by abutting against the bottom 69 or end of the bellows 65 opposite the supported end. The bottom 69 of the bellows 65 is fixedly attached to the shaft 64 by any suitable means so that axial motion of the shaft takes place in response to linear extension or contraction of the bellows 65.

The control spring 68 is designed to have suitable strength to maintain the bellows 65 in proper position for a given fluid pressure in the duct 11. Preferably a simple resilient member such as a spring 68 is used in a valve control mechanism 10 which is adapted for operation at a given back pressure in the duct 11. However, in some operations, it may be desirable to have a variable control. In such case, a second bellows, for example controllably operated by an external compressed air source might be used to replace the resilient spring 68, so that adjustment could be made for maintaining a variety of fluid back pressures.

In the normal operation of the valve mechanism 10, a fluid flows through the duct at a given flow rate and at a given back pressure and the pressure in the piston chambers 28 and 29 is equal so as to maintain the piston 25 in a given position, which in turn maintains the damper 12 in a given position. The piston 61, in closing off the vents 59 and 60 in the cylinder 47, thereby effectively prevents venting of the fluid pressure from either of the chambers 28 and 29.

However, if the fluid back pressure decreases in the duct 11 at the upstream end 13, the fluid pressure operating the bellows 65 also decreases so as to cause linear contraction thereof upwardly, which in turn moves the shaft 64 upwardly. Upward movement of the shaft 64 causes upward movement of the piston 61 and, in particular, upward movement of the upper piston member 62 which normally closes the vent 59. As the upper piston member 62 travels upwardly, it opens the vent 59 which permits the flow of fluid from the line 40 through the passageway 43 and the vent 59 through the cylinder 47 out the vents 52b and 52c. Such flow of fluid in the line 40 causes fluid to be removed from the bottom chamber 28 of the cylinder 20 through the passageway 41 and thereby causes a reduction in the fluid pressure in the chamber 28. Accordingly, a pressure differential is created across the piston 25, since the pressure in the lower chamber 28 has been reduced below the pressure of the upper chamber 29. The fluid pressure in the upper chamber 29 pushes the piston 25 downwardly in an attempt to correct the pressure differential across the piston 25.

Downward movement of the piston 25 causes opening of the damper 12 which, in turn, causes a reduction in the restriction of fluid flow in the duct 11, thereby permitting a greater fluid flow rate past the damper 12. Movement of the shaft 19 in conjunction with movement of the piston 25 also causes rotation of the cam lever 53 which in turn causes an upward movement of the cylinder 47 and a corresponding upward movement of the vent 59 therein. The upward movement of the vent 59 continues until the vent 59 has been closed off again by the upper piston member 62. When the vent 59 is closed off, the pressure differential across the piston 25 is eliminated, movement of the shaft 19 ceases and a new position has been assumed by the valve.

It can be seen that a decrease in back pressure causes movement of the piston 61, in response to such decrease, so as to create a pressure differential across the piston 25 tending to open the damper 12. An increase in the back pressure, in contrast, tends to close the damper 12. The extent to which the damper 12 actually opens or closes is, however, not a straight-line function of the pressure change because of the action of the cam lever 53. In other words, the distance which the damper 12 moves toward opening, for example, is that distance necessary to effect the closing of the vent 59 by movement of the cylinder 47 in response to the cam lever 53 movement. It will be appreciated that the cam surface 54, or any portion thereof, may be so shaped that, in coacting with the cylinder 47, it causes the cylinder 47 to move at the same or a rate differing from the rate at which the shaft 19 moves in opening or closing the damper 12. The cam surface 54 may be shaped so that with successive decreases in back pressure a successively smaller opening movement of the damper 12 is effected. The cam lever 53 is thus a follow-up means which moves the cylinder 47 according to a desired predetermined non-linear function. Since the action of the cam surface 54 depends upon the particular position of the cam lever 53 which, in turn, depends upon the position of the damper 12, the modulating function of the cam lever 53 is responsive to the valve or damper position.

Another aspect of the instant invention resides in the particularly advantageous arrangement involving a cutoff actuator valve 70. The cutoff valve 70 comprises a fixed cylinder 71 closed at one end by a wall 72 and apertured at the opposite end wall 73 to receive a piston shaft 74. The piston shaft 74 has fixedly mounted thereon within the cylinder 71 twin pistons of the dump-bell type which (in the on position) are held in compression against a spring 75 by a releasable force such as a solenoid 76 engaging the portion of the shaft 74 extending beyond the piston end wall 73. The twin pistons comprise a first piston member 77 rigidly mounted by any suitable means at one extremity of the shaft 74 and a second piston member 78 mounted on the shaft fixedly a given distance from the first piston member 77 and abutting the compressed spring 75.

The side walls of the cylinder 71 contain a pair of communicating passageways 79 and 80 which communicate with a first chamber 81 formed by the end wall 72, the first piston member 77 and the side walls of the cylinder 71.

The chamber 81 and its communicating passageways 79 and 80 are arranged during normal operation, as shown in Figure 1, to permit free flow of fluid through the vent line 40 from the opening 41 in the cylinder 20 to the passageway 43 in the sleeve 42.

In similar manner a second pair of passageways 82 and 83, are spaced from the first passageways in the side walls of the cylinder 71. The passageways 82 and 83 communicate with a chamber 84 formed by the first piston member 77, the second piston member 78 and the walls of the cylinder 71. The second chamber 84 and its communicating passageways 82 and 83 during normal operation are so positioned that fluid may flow freely in the vent line 44 from the opening 45 in the cylinder 20 to the passageway 46 in the sleeve 42.

During normal operation the valve mechanism 10 is actuated entirely by the cooperation between the piston 61 and the movable cylinder 47, which is a closed operating mechanism. However, the operation of the piston 61 and the cylinder 47 is generally a purely automatic operation adapted to operate continuously, but in the absence of additional control means for or in place of the spring 68 not adapted to turn the valve mechanism 10 on or off. In contrast, the cut-off valve 70 is actuated by an external force, as for example, the solenoid 76. By positioning the cut-off valve 70 at intermediate points in the vent lines 40 and 44 which permit the coacting piston 61 and cylinder 47 to actuate the piston 25, it is possible to have an on and off control valve which is capable of completely dominating the action of the automatic piston and cylinder mechanism of the piston 61 and cylinder 47.

In order to put the cut-off valve in off position, it is necessary merely to release the solenoid 76 (which in turn may be actuated by a safety device or simply by a manually operable switch). As soon as the solenoid 76 is released, the spring 75 urges the twin pistons forward so that the first piston member 77 abuts the end wall 72 and completely closes off the pair of communicating passageways 79 and 80, so as to block completely any flow in the vent line 40. The second piston member 78 moves through and past the space occupied by the second chamber 84 so as to permit communication between the pair of passageways 82 and 83, and to permit the flow of fluid from the line 44 past the spring 75 and out a vent 85 which forms an opening to the air in the end wall 73. The net result is a reduction in the fluid pressure in the top chamber 29 of the cylinder 20, whereby the piston 25 is caused to rise upwardly a maximum distance in the cylinder 20 and to thereby close the damper 12.

Referring to Figure 4, the reference numeral 86 indicates generally another valve control mechanism embodying the invention mounted on a cylindrical duct 87 for controlling the flow therethrough of a fluid (such as air) which ordinarily has variable flow rate and pressure. The flowing fluid approaches a fluid control member or valve gate 88 from the upstream side 89 of the duct 87, flowing against the gate 88. In Figure 4 the gate 88 is closed; but, to the extent that the gate is opened during normal operation, a portion of the fluid passes on into the downstream end 90 of the duct 87. The gate 88 is a disc-shaped member having an upwardly extending apertured tongue member 91 which is operatively connected to a hollow actuating stem 92, for example, by a cross bolt 93 passing through the aperture.

The gate 88 is raised or lowered by verticle movement of the stem 92, which acts as an actuator for opening and closing the valve. The hollow stem 92 is slidably mounted for axial vertical movement in a sleeve housing 94. The housing 94 extends surroundingly of the stem 92 from a top portion 95, slidably engaging the stem 92, downwardly until it approaches the duct 87 whereupon the housing 94 merges communicatingly with an annular housing 96 which encircles that portion of the duct 87 mounting the gate 88. The annular housing 96 is mounted on a flange portion 97 of the duct 87 on the downstream side of the gate 88 for fluid-tight sealing with the gate 88 in closed position. On the upstream side of the gate 88 a peripherally disposed passageway 98 affords fluid communication between the duct 87 and the interior of the annular housing 96, which in turn, communicates with the interior of the sleeve housing 94. The interior of the sleeve housing 94 communicates with the interior of the hollow stem 92 by means of passageways 99 at the lower extremity of the stem 92 adjacent the cross bolt 93.

At the upper extremity of the stem 92 is a flange member 100. A calibrated control spring 101 abuts the flange member 100 and extends downwardly and surroundingly of the stem 92, into engagement with a ring member 102. The ring 102 slidably engages the outside of the stem 92 and is urged downwardly by the spring 101.

The ring 102 has integral arms 103 extending radially into the interior of the hollow stem 92 through axially aligned slots 104 in the walls of the stem 92. The ring 102 and the arms 103 are slidably engaged with the stem 92 for free relative axial movement. In the interior of the stem 92, the arms 103 merge integrally with the top extremity of a shaft 105 having a pilot piston 106 suitably mounted at its lower extremity. The piston 106 slidably engages the interior walls of the stem 92 and is adapted for free axial movement within the stem 92.

The pilot piston 106 forms a fluid-tight seal by its engagement with the interior walls of the stem 92. It will thus be appreciated that the pilot piston 106 is in fluid communication with the upstream end 89 of the duct 87, and the fluid pressure urging the pilot piston 106 upwardly is substantially the back pressure at the upstream end 89 of the duct 87. The upward motion of the pilot piston 106, which is urged by the fluid back pressure, is resisted by the calibrated spring 101 acting against the ring 102 which is connected to the piston shaft 105.

Suitably mounted above the housing 94 and surroundingly of the stem 92 is an upright cylinder 107. The stem 92 passes longitudinally through the cylinder 107, passing through the bottom wall 108 and the top wall 109 thereof, so as to be freely movable longitudinally in the cylinder 107 and to form fluid seals in cooperation with the top and bottom walls 108 and 109.

Rigidly mounted upon a central portion of the stem 92 by any suitable means is power piston 110 retained within the cylinder 107 for slidably operating therewith to form a fluid seal at the interface 111 between the peripheral walls of the piston 110 and the interior cylindrical walls of the cylinder 107. The piston 110 so positioned forms a fluid-tight separating wall between a lower chamber 112 (enclosed by the bottom wall 108, the interior walls of the cylinder 107 and the piston 110) and an upper chamber 113 (enclosed by the top wall 109, the interior walls of the cylinder 107 and the piston 110).

The cylinder 107 having the piston 110 therein and relatively movable thereto for drivingly engaging the stem 92 to raise and lower the gate 88 constitutes a double-acting power cylinder in control of the valve, or in control of the operation of the gate 88. The double-acting power cylinder operates in response to the creation of a fluid pressure differential across the piston 110.

A passageway 114 affords fluid communication between the lower chamber 112 and a port 115 leading to a cylindrical vent chamber 116 mounted vertically upon the top wall 109 of the cylinder 107. A second passageway 117 affords fluid communication between the upper chamber 113 and a second port 118 also leading to the cylindrical vent chamber 116. The port 115 is positioned on the cylindrical walls of the vent chamber 116 in spaced relation above the second port 118; and a venting port 119 positioned between the ports 115 and 118 and on the opposite side of the vent chamber 116 communicate with the atmosphere.

Slidably mounted within the cylindrical vent chamber 116 is a dumb-bell type valve piston 120 comprising enlarged top and bottom portions which slidably engage the walls of the chamber 116 to form fluid-tight seals and a restricted integral stem portion connecting the top and bottom portions. The function of the valve piston 120 is similar to the function of the piston 61 shown in Figure 1 in creating an actuating fluid pressure differential for the double acting power cylinder.

Fluid pressure in the upper chamber 113 is built up by bleeding fluid through the restricted passageway 121 affording communication between the interior of the stem 92 and the upper chamber 113; and a normally equal amount of fluid pressure is built up in the lower chamber 112 by bleeding fluid thereinto through the restricted passageway 122 communicating with the interior of the stem 92.

As will be described in more detail hereinafter, the valve piston 120 is so designed that it may be positioned so as to close off both the ports 115 and 118, or it may be positioned so as to open only one of such ports and thereby to effect a pressure reduction in one of such chambers. As can be seen from Figure 4, the valve piston 120 is in the "up" position and in such position it blocks off the lower port 118 and opens the upper port 115, thereby permitting fluid pressure in the lower chamber 112 to be vented off through the passageway 114, the port 115, the vent chamber 116 and the venting port 119 to the atmosphere. Such a valve piston position creates a pressure differential that forces the piston 110 down and thereby closes the gate 88.

It can thus be seen that Figure 4 shows the "off" position of the instant valve mechanism. The "off" position so described is brought about by the use of the cut-off actuator represented generally by the reference numeral 123.

The cut off actuator 123 consists of a vertically extending cylindrical housing 124 mounted adjacent the chamber 116 and having a piston 125 slidably mounted therein and urged downwardly by a spring 126 positioned between the top interior portion of the housing 124 and the top of the piston 125. An electrically energizable coil 127 is mounted in the housing around the piston 125 for slidable engagement therewith and, when energized, the coil 127 draws the piston 125 upwardly compressing the spring 126. When the electric current to the coil 127 is cut off, for example, by some safety device or by manual operation of a switch, the coil 127 releases the piston 125 and the spring 126 urges the piston 125 downwardly against one arm 128 of a cut-off lever 129.

The lever 129 is mounted on a fixed pivot 130 and has one arm 128 extending directly below the piston 125 and the other arm 131 extending directly below the valve piston 120 in the vent chamber 116. When the coil 127 is de-energized by cutting off the electric current, the spring 126 forces the piston 125 down into contact with the lever arm 128. The lever arm 128 is then pushed downwardly forcing the lever arm 131 to move upwardly into contact with the bottom of the valve piston 120 and to force the valve piston 120 upwardly to the position shown in Figure 4. As has been explained, the position of Figure 4 is the "off" position of the valve wherein the lower chamber 112 is constantly vented to the air and the pressure in the upper chamber 113 against the piston 110 maintains the gate 88 in closed position.

In the operation of the valve mechanism of Figure 4, assuming a starting position as shown and a back pressure in the upstream end 89 of the duct 87, the first step involves energizing the coil 127 to set the actuator 123 in "on" position. As soon as the coil 127 is energized, the piston 125 is drawn upward and the lever arm 131 drops downwardly, releasing the valve piston 120. The valve piston 120, which is urged downwardly by a relatively weak spring assembly 132 acting upon a top flange 133 on the top stem portion of the valve piston 120, then moves down to the position shown in Figure 5a.

Referring to Figure 5a, it can be seen that the coil 127 is energized and the valve piston 120 has moved to a position in which it blocks the top port 115 and opens the bottom port 118. In such position, the fluid pressure in the upper chamber 113 is decreased by flow through the passageway 117, the port 118, the vent chamber 116 and the venting port 119; and the fluid pressure in the lower chamber 112 is increased since venting through the passageway 114 and the port 115 is blocked and fluid flow through the restricted passageway 122 continues. As a consequence, the pressure differential across the power piston 110 urges the piston 110 upwardly thereby opening the gate 88 attached to the stem 92.

The back pressure of the fluid at the gate 88 is, as has been explained previously, substantially the same as the fluid pressure in the interior of the stem 92, the pressure loss through the restricted passageways 121 and 122 being disregarded. Accordingly, the back pressure is exerted against the pilot piston 106 and the equalization of the back pressure force and the force of the spring 101 establishes the position of the pilot piston 106 in the stem 92. That equalization also establishes the position of the ring 102 on the stem 92. As the stem 92 moves upwardly, the ring 102 having a position on the stem 92 established by the equalization of forces, finally comes into contact with the flange 133 on the stem portion of the valve piston 120. Such is the position shown in Figure 5a.

Figure 5b shows the next position which results. The ring 102, being held in position by forces much stronger than the resistance to compressibility of the spring assembly 132, forces the flange 133 and valve piston 120 upwardly along with the continued upward movement of the stem 92. However, as soon as the valve piston 120 has been moved upwardly to the position shown in Figure 5b, the valve piston 120 closes off both ports 115 and 118. Since venting in either of the chambers 112 and 113 is thereby discontinued, the actuating fluid pressure differential across the power piston 110 is eliminated and motion of the stem 92 is discontinued.

In the position shown in Figure 5b, all actuating forces are equalized. The position of the ring 102 with respect to the stem 92 has been established by counter balancing the downward thrust of the spring 101 against the upward force of the back pressure against the pilot piston 106. The position of the valve piston 120 has been fixed by the cooperation between the ring 102 and the flange 133. The positioning of the valve piston 120 results in an equalization of the fluid pressures in each of the chambers 112 and 113. Such is the position in which the valve mechanism remains until there is a change in the back pressure in the upstream end 89 of the duct 87.

If the back pressure in the duct 87 increases, the first change in position is shown in Figure 5c. The first change which takes place is that resulting from an increase in the back pressure exerted against the pilot piston 106. The piston 106 moves upward slightly so as to additionally compress the spring 101 resisting its upward movement. The ring 102 then assumes a new position on the stem 92 based upon the equalization of the back pressure force and the force of the spring 101. In this instance, this increase in back pressure results in a slight upward movement of the ring 102 which, in turn, raises the flange 133 and the valve piston 120. Such movement of the valve piston 120 uncovers the port 115 thereby venting the lower chamber 112 in the manner hereinafter described. As soon as the lower chamber 112 is vented, an actuating pressure differential across the power piston 110 starts to urge the power piston 110 downwardly.

Figure 5d shows the new position then assumed by the mechanism. In Figure 5d, it can be seen that the power piston 110 has moved downwardly from its position shown in Figure 5c. The gate 88 has, of course, been closed correspondingly. As the power piston 110 moved downwardly to the position of Figure 5d, the stem 92 with the ring 102 positioned thereon moved downwardly permitting the flange 133 urged by the spring assembly 132 to follow. As the flange 133 followed the ring 102 downwardly it moved the valve piston 120 down to block off the port 115. Venting of the lower chamber 112 was thus immediately discontinued and the actuating pressure differential across the power piston 110 disappeared. The position of Figure 5d was thereby obtained.

It can thus be seen that, in the position shown in Figure 5d, all the actuating forces are again equalized. The spring 101 is more greatly compressed in Figure 5d than it is in Figure 5b because Figure 5d represents the situation in which the back pressure is higher. It will of course be appreciated that the extent to which the spring 101 is compressed determines the ultimate position of the gate 88 in the duct 87. On the other hand, the spring 101 is compressed by action of the back pressure in the duct 87. By calibrating the spring 101 so that it becomes increasingly or decreasingly resistant to compression with each additional increment of distance that it is compressed, it is possible to incorporate a non-linear function in the operation of the valve mechanism.

The spring 101 is so calibrated that it becomes increasingly difficult in a predetermined manner to compress it each additional unit of distance. Accordingly, it will be appreciated that as the available back pressure increases, the valve gate 88 is partially closed according to a predetermined scheduled demand curve. Since the action of the spring 101 depends upon the extent to which it is compressed or its linear dimension at the time action is required, and that dimension depends, in turn, upon the particular position of the gate 88 under the operating conditions involved, the modulating function of the spring 101 is responsive to the gate position.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. A flow control apparatus comprising, in combination, a duct to carry a flow of fluid, a valve in said duct to control the flow of fluid therethrough, a first cylinder, a first piston movable in said first cylinder, a hollow valve stem connecting said first piston and said valve and communicating with said duct, said hollow stem being apertured to bleed fluid from said duct into said first cylinder on opposite sides of said first cylinder piston, a pilot piston and cylinder mounted communicatingly on said hollow stem, a spring on said pilot cylinder resisting movement of said pilot piston in response to fluid pressure communicated from said hollow stem, a pair of vents communicating with said first cylinder on opposite sides of said first piston, a pilot valve piston selectively opening and closing each of said vents, and cooperating means between said pilot piston and said pilot valve piston moving the pilot valve piston in response to movement of the pilot piston.

2. In a mechanism for operating a valve for controlling the flow of fluid therethrough in a duct, a double acting power cylinder, a driving connection between said power cylinder and said valve, said driving connection being a hollow shaft affording fluid communication between said duct and opposite ends of said power cylinder, a pressure responsive pilot piston mounted in said hollow shaft, a resilient member resisting motion of said pilot piston, and means operatively connected to said pilot piston and communicating with said power cylinder for actuation thereof in response to the fluid pressure in the duct and the position of the valve therein.

3. In a mechanism for operating a valve for controlling the flow of fluid therethrough in a duct, a double acting power cylinder, a driving connection between said power cylinder and said valve, said driving connection defining a hollow shaft affording fluid communication between the duct and opposite ends of said power cylinder, a pressure responsive pilot piston mounted in said hollow shaft, a resilient member resisting motion of said pilot piston, vent means for opposite ends of said power cylinder, a pilot valve in control of said vent means, and means actuating said pilot valve in response to movement of said pilot piston.

4. In a mechanism for operating a valve for controlling the flow of fluid therethrough in a duct, a double acting power cylinder, a driving connection between said power cylinder and said valve, said driving connection defining a hollow shaft affording fluid communication between the duct and opposite ends of said power cylinder, a pressure responsive pilot piston mounted in said hollow shaft, a resilient member resisting motion of said pilot piston, a first member carried by said pilot piston, vent means for opposite ends of said power cylinder, a pilot valve in control of said vent means, and a second member carried by said pilot valve and engaging said first member for comovement therewith.

5. In a mechanism for operating a valve for controlling the flow of fluid therethrough in a duct, a double acting power cylinder, a driving connection between said power cylinder and said valve, said driving connection defining a hollow shaft affording fluid communication between the duct and opposite ends of said power cylinder, a pressure responsive pilot piston mounted in said hollow shaft, a resilient member resisting motion of said pilot piston, vent means for opposite ends of said power cylinder, a pilot valve cylinder communicating with said vent means, a pilot valve piston movable in said pilot valve cylinder and selectively opening and closing said vents, and means actuating said pilot valve cylinder in response to movement of said pilot piston.

6. In a mechanism for operating a valve for controlling the flow of fluid therethrough in a duct, a double acting power cylinder, a driving connection between said power cylinder and said valve, said driving connection defining a hollow shaft affording fluid communication between the duct and opposite ends of said power cylinder, a pressure responsive pilot piston mounted in said hollow shaft, a resilient member resisting motion of said pilot piston, vent means for opposite ends of said power cylinder, a pilot valve cylinder communicating with said vent means, a pilot valve piston movable in said pilot valve cylinder and selectively opening and closing said vents, a first member carried by said pilot piston, and a second member carried by said pilot valve piston and engaging the first member for comovement therewith.

7. In a mechanism for operating a valve for controlling the flow of fluid therethrough in a duct, a double acting power cylinder, a driving connection between said power cylinder and said valve, said driving connection defining a hollow shaft affording fluid communication between the duct and opposite ends of said power cylinder, a pressure responsive pilot piston mounted in said hollow shaft, a resilient member resisting motion of said pilot piston, vent means for opposite ends of said power cylinder, a pilot valve cylinder communicating with said vent means, a pilot valve piston movable in said pilot valve cylinder and selectively opening and closing said vents, a first member carried by said pilot piston, a second member carried by said pilot valve piston and engaging the first member for comovement therewith, and resilient means urging said second member toward said first member.

8. In a flow control apparatus, a gas inlet duct, a throttle valve in said duct, a double acting power cylinder for controlling said throttle valve and positively secured to said throttle valve as the sole actuator thereof, a pilot valve for venting selected sides of said power cylinder to move said throttle valve, means responsive to gas pressure in the duct upstream of said throttle valve for actuating said pilot valve, follow-up linkage means connected for movement with said throttle valve at all times and operatively connected with said pilot valve to overrule the means actuating said pilot valve in a direction causing movement of the throttle valve in opening direction, and means communicating gas under positive pressure in the duct upstream of said throttle valve to opposite ends of said power cylinder, whereby the position of said throttle valve in said duct will be scheduled against the gas inlet pressure in said duct.

9. Gas flow control apparatus as set forth in claim 8 whereby said means responsive to gas pressure in the duct upstream of said throttle valve comprises a fluid motor acting against said pilot valve and including a conduit connecting said fluid motor to the gas inlet duct at a point upstream of said throttle valve.

10. Gas flow control apparatus as recited in claim 8 wherein said pilot valve comprises a reciprocable spool valve having a valve core movable in a sleeve which is in turn reciprocably mounted within a valve housing, means porting said sleeve, vent means separately porting said housing and said sleeve to atmosphere, said core having lands thereon for selectively connecting one or the other sides of said power cylinder to said vent, and wherein said follow-up linkage means is operatively connected to said sleeve for the reciprocation thereof and said means responsive to gas pressure in the duct upstream of said throttle valve comprises a fluid motor operatively connected to said core to reciprocate said core in said sleeve.

11. Gas flow control structure as recited in claim 10 wherein the operative connection between said follow-up linkage means and said sleeve comprises a cam construction.

References Cited in the file of this patent

UNITED STATES PATENTS

| | | |
|---|---|---|
| 1,199,847 | Wilkins | Oct. 3, 1916 |
| 1,311,536 | Smoot | July 29, 1919 |

(Other references on following page)

UNITED STATES PATENTS

| | | |
|---|---|---|
| 1,796,968 | Smoot | Mar. 17, 1931 |
| 1,893,462 | Wait | Jan. 3, 1933 |
| 1,966,849 | Cody | July 17, 1934 |
| 2,020,847 | Mitereff | Nov. 12, 1935 |
| 2,053,797 | King | Sept. 8, 1936 |
| 2,091,669 | Bryant | Aug. 31, 1937 |
| 2,189,475 | Saur | Feb. 6, 1940 |
| 2,258,136 | Folgmann | Oct. 7, 1941 |
| 2,507,498 | Brown | May 16, 1950 |
| 2,566,776 | Otis | Sept. 4, 1951 |

FOREIGN PATENTS

| | | |
|---|---|---|
| 391,328 | Germany | Mar. 3, 1924 |